United States Patent
Heller

[15] 3,668,047
[45] June 6, 1972

[54] BONDING MACHINE

[72] Inventor: Kenneth G. Heller, 335 Palomar Drive, Redwood City, Calif. 94062

[22] Filed: Nov. 20, 1969

[21] Appl. No.: 878,514

[52] U.S. Cl..............................156/541, 156/249, 156/344, 156/584
[51] Int. Cl........................................B32b 31/06, B65c 9/18
[58] Field of Search..................156/247, 249, 344, 542, 584, 156/301, 541

[56] References Cited

UNITED STATES PATENTS

| | | | |
|---|---|---|---|
| 3,271,227 | 9/1966 | Jaeckel | 156/584 X |
| 3,240,652 | 3/1966 | Le Mers | 156/584 X |
| 2,940,884 | 6/1960 | White | 156/301 X |

Primary Examiner—Benjamin A. Borchelt
Assistant Examiner—J. M. Hanley

[57] ABSTRACT

A bonding machine for adhesively joining sheets of paper or the like, having as its principal elements a housing, and within it an anvil, an actuating mechanism, and a tape system. When the machine is idle there exists a gap between the anvil and the surface of the actuating mechanism facing it. Sheets to be bonded are placed into this gap. When the actuating mechanism is depressed it moves down toward the anvil, thus compressing the sheets. Upon releasing the actuating mechanism it moves away from the anvil and picks up the topmost sheet by vacuum action. At the same time the tape system transports a two-sided adhesive sticker between the separated sheets. When the actuating mechanism is again depressed, the sheets are recompressed but this time over the sticker, thus making a bond. The bonded sheets may be withdrawn as soon as the actuating mechanism is released again. The cycle may be repeated several times if more than two sheets are to be bonded together. The tape system, preferably in cartridge form, consists of two-sided adhesive stickers stored on a supply spool between cover films. A takeup spool reels in spent cover films. Gears, drive sprockets, and clutches transmit and synchronize motions of actuating mechanism, tape, and spools, so that the stickers are fed into the gap at the correct moment, and to the correct depth, and so that the proper tension in tape and spent films is maintained at all times.

11 Claims, 4 Drawing Figures

INVENTOR
KENNETH G. HELLER
BY

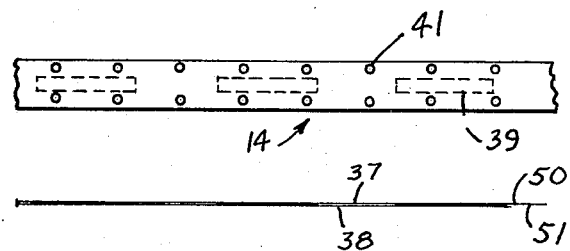
FIG-2-
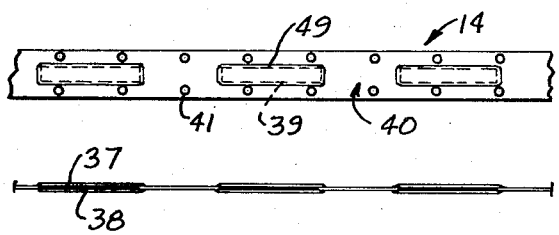
FIG-3-
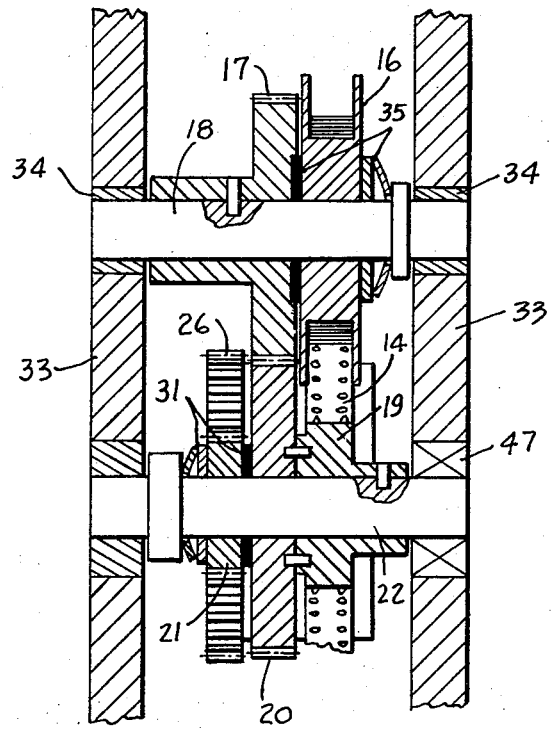
FIG-4-
INVENTOR.
KENNETH G. HELLER
BY

BONDING MACHINE

FIELD OF THE INVENTION

This invention relates to, and in general has for its object the provision of a machine for the joining together of sheets of material, such as paper, by adhesive means.

DESCRIPTION OF THE PRIOR ART

In the past two or three decades there have been used for joining of sheets machines generally known as staplers, which push U-shaped pointed wire staples through the sheets, and then effect a mechanical bond by bending the ends of the staples together. Numerous such devices are on the market, and several patents, such as U.S. Pat. Nos. 2,424,649 and 3,144,653, cover in their claims various elements of such staplers. Although convenient and cheap to use, and finding wide application, these staplers have a number of disadvantages. A notable case in point is that the staple must pass through the sheets to be fastened, thus permanently damaging them. Stapled sheets may also damage adjacent materials, such as envelopes, in handling. There is also a tendency on the part of the user to discard loose or removed staples carelessly with the risk that if this is done on or about delicate office machines, such as automatic copiers, damage to these machines may result. Copying machines will also show an image of staples fastening sheets on copies made. Another drawback of sharp metallic staples is that they can injure users, particularly when they are removed by hand by bending back the pointed ends.

SUMMARY OF THE INVENTION

My invention provides a clean, rapid, automatic, and safe way of bonding sheets of material, such as paper, and eliminates the disadvantages of conventional staplers cited above. More specifically, the object of my invention is the provision of a bonding machine into which two or more sheets can be inserted, and then bonded together by stickers coated with adhesive on front and back surfaces.

Another object of my invention is the provision of a synchronized actuating mechanism and tape feed mechanism in which sheets to be bonded are separated, cover film is peeled from an adhesive sticker, the sticker interposed between the sheets, and the sheets then rejoined to form a bond via the sticker.

It is a further object of my invention that the bonding cycle can be repeated as often as desired to bond a plurality of sheets.

It is another object of my invention that the tape system, containing stickers, cover films, and all necessary spools, drives, gears, and clutches, be in the form of a cartridge which can be preassembled, and inserted into, or removed from the bonding machine's housing as a unit.

Another purpose of my invention is the provision of a bonding tape comprising a series of two-sided self-adhesive stickers layered between two cover films. In another variation of the invention the stickers are carried on a single film. Yet another variation provides that stickers be encapsulated between two cover films to form vapor-tight chambers about each sticker in order to keep moisturized adhesive coatings from drying out.

The invention possesses other advantageous features, some of which, with the foregoing, will be set forth at length in the following description where that form of the invention which has been selected for illustration in the drawings accompanying and forming a part of the present specification is outlined in full. In said drawings one form of the invention is shown, but it is to be understood that it is not limited to such form, since the invention as set forth in the claims may be embodied in a plurality of forms.

DESCRIPTION OF THE DRAWINGS

FIG. 2 is a detail view of the bonding tape containing two-sided self-adhesive stickers, viewed along A—A, and FIG. 3 is a similar view of bonding tape containing two-sided adhesive stickers sealed in vapor-tight manner between two cover films.

FIG. 4 is a partial sectional view, taken through B—B.

DESCRIPTION OF THE PREFERRED EMBODIMENT

Figure 1:
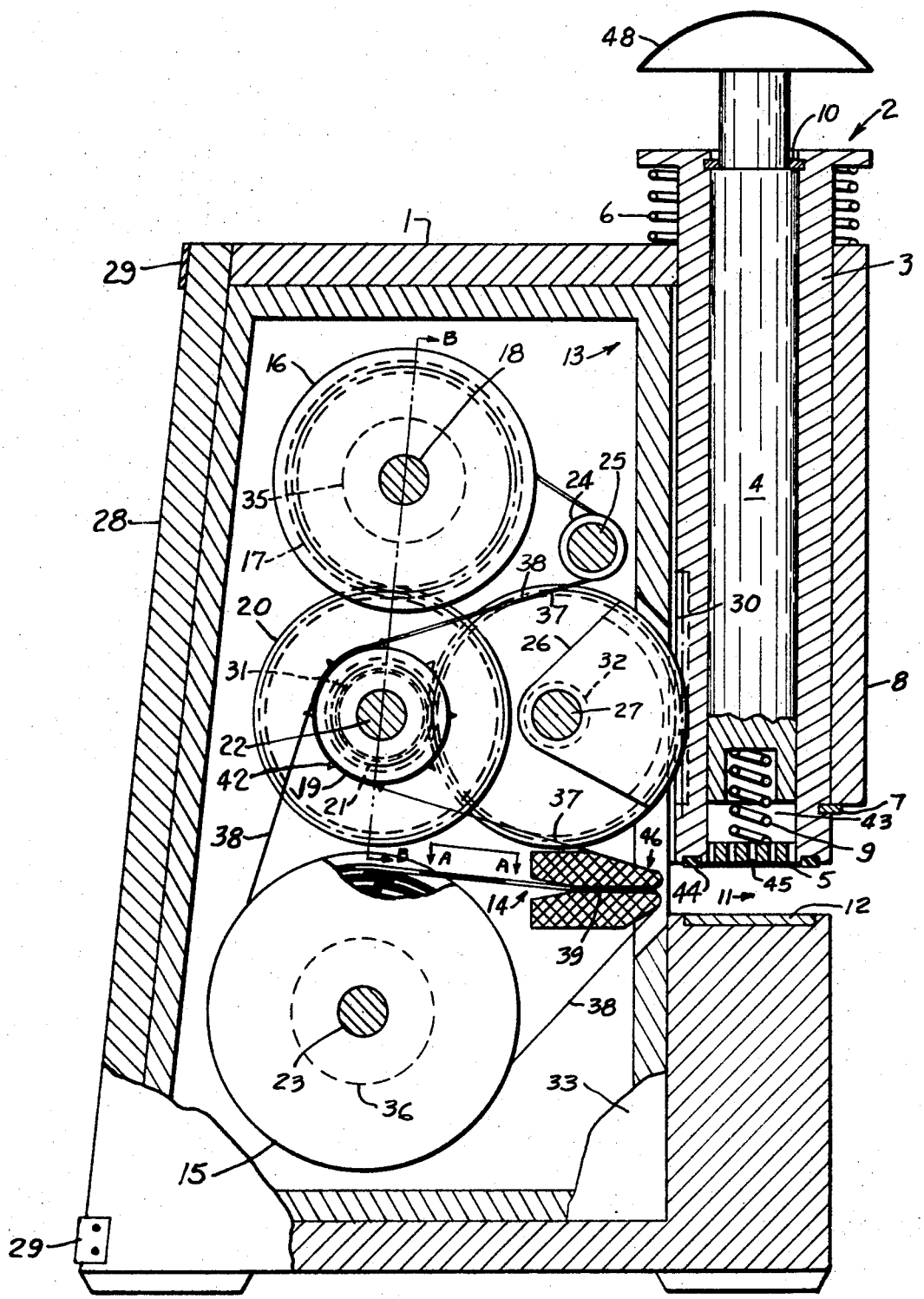
FIG. 1 is a schematic elevation view of a bonding machine embodying the objects of my invention.

Referring now to the drawings for a more complete understanding of the invention, the bonding machine includes a housing 1 in which an actuating mechanism 2, consisting of cylinder 3, plunger 4, and face plate 5, is slideably mounted. When no external force is applied to plunger 4, return spring 6 biases cylinder 3 upwardly in housing 1 so that retaining ring 7 abuts the bottom surface of the barrel 8 of housing 1. Furthermore, suction spring 9 biases plunger 4 upwardly in cylinder 3 so that the shoulder of plunger 4 abuts the retaining ring 10 of cylinder 3. With actuating mechanism 2 in its upward position, an insertion gap 11 is formed between the face plate 5 and anvil 12.

The apparatus also comprises a cartridge 13 containing bonding tape 14 on supply spool 15. The cartridge 13 further contains a takeup spool 16, a spur gear 17 on shaft 18, a drive sprocket 19 as well as spur gears 20 and 21 on shaft 22, idler pulley 24 on shaft 25, sector gear 26 on shaft 27, and head 46. The cartridge 13 is inserted into housing 1 through an opening in the back formed when cover 28 is removed. Upon replacing the cartridge 13, or inserting a new one when the old one is empty of stickers 39, the cover 28 is replaced and secured by clasps 29. With cartridge 13 thus constrained in housing 1, sector gear 26 engages rack 30 of cylinder 3.

Sector gear 26 is fixed to shaft 27 which is journalled in bearings 32 in side plates 33 of cartridge 13. Drive sprocket 19 and gear 20 are rigidly attached to each other and to shaft 22, the latter engaging a clutch 47 mounted in side plate 33. This clutch permits only clockwise rotation of shaft 22 and parts fixed to it. Gear 21 is rotatably mounted on shaft 22, and meshes with sector gear 26. In turn gear 21 acts upon gear 20 through slip clutch 31. Gear 17 is fixed to shaft 18 which is journalled in bearings 34 in side plates 33. Takeup spool 16 is rotatably mounted on shaft 18, and receives turning torque from gear 17 through slip clutch 35. Supply spool 15 rotates on shaft 23, fixed at its ends to side plates 33, against the resistance of slip clutch 36, thus maintaining tension in bonding tape 14 as it is withdrawn from supply spool 15. Shaft 25 is fixed to side plates 33, and idler pulley 24 freely rotates on shaft 25.

The bonding tape 14 as depicted in FIG. 2 consists of cover films 37 and 38 disposed between which are a plurality of stickers 39. STickers 39 are adhesive-coated on front and back surfaces, and have a length approximately equal to one-half the center-to-center distance between adjacent stickers 39. Perforations 41 on both edges of cover films 37 and 38 are spaced to register with points 42 of drive sprocket 19.

The adhesive used on stickers 39 in the arrangement shown in FIG. 2 is of the self-adhesive type, i.e., requires only contact or pressure to effect adhesion between the stickers 39 and sheets of material to be bonded. Stickers 39 are made of a thin, flexible material such as paper, fabric, or plastic, as are also the cover films 37 and 38.

It will be readily apparent that cover film 38 may be omitted when using self-adhesive stickers 39, provided that the adhesion between sticker 39 and surface 51 of cover film 37 is greater than between sticker 39 and surface 50. This differential adhesion insures that stickers 39 will adhere to surface 51 as the bonding tape 14 separates from the supply spool 15 and travels to the head 46. Thus each sticker 39 finds itself on that side of cover film 37 which flexes convexly in going about the acute-angled head, thus causing the stickers to peel off.

In the bonding tape as shown in FIG. 3, stickers 39 are coated with a moisturized adhesive, and are sealed between cover films 37 and 38 by seal beads 40 to form vapor-tight compartments 49.

Detailed formulations of adhesives, and descriptions of bearings, spools, slip clutches, and unidirectional clutches have been omitted as these, taken singly, are not claimed as new, and are well known to those versed in the respective fields of technology.

OPERATION

Consider the machine at rest with bonding tape 14 and cover films 37 and 38 threaded from supply spool 15, through head 46, over drive sprocket 19, over pulley 25, and onto takeup spool 16, as shown in FIG. 1. A sticker 39 is in the head 46, and actuating mechanism 2 is biased upwardly thus opening insertion gap 11 to its fullest compass. Two sheets of paper are now assumed to be inserted into insertion gap 11. As knob 48 is depressed by the user's hand, plunger 4 descends in cylinder 3 to contact face plate 5, thus compressing suction spring 9. Air is discharged from chamber 43 and concurrently cylinder 3 descends until the two sheets of paper are compressed between face plate 5 and anvil 12. Seal ring 44 provides for air-tight contact between face plate 5 and the upper of the two sheets.

In the downward motion of cylinder 3, rack 30 rotates sector gear 26 clockwise and gear 21 counterclockwise. Because of the unidirectional nature of clutch 47 there can be only clockwise motion of shaft 22 and of drive sprocket 19 and gear 20, and therefore gear 21 merely slips on shaft 22. All tape-carrying elements therefore remain motionless and the tape is not advanced. Now, as the user's hand is lifted from knob 48, plunger 4 ascends under the action of suction spring 9 causing a vacuum to be formed in chamber 43. This suction sucks the upper of the two sheets, by way of suction orifices 45, against face plate 5, and causes this sheet to be raised and separated from the lower sheet. As cylinder 3 concurrently ascends under the action of return spring 6, rack 30 causes sector gear 26 to turn counterclockwise, and gear 21 clockwise. The slip torque of slip clutch 31 is adjusted so that clockwise rotation of gear 21 causes gear 20 and drive sprocket 19 to turn clockwise through the same angle of rotation as gear 21, thus pulling precisely metered lengths of cover films 37 and 38 over drive sprocket 19. An equal amount of bonding tape 14 is thereby dispensed from supply spool 15 through head 46, where the cover films 37 and 38 are peeled from the sticker 39. Sticker 39 now projects into the insertion gap 11, held by its trailing edge by head 46 in a position intermediate the two sheets of paper. Slip clutch 36 is adjusted to maintain tension in bonding tape 14 at a force level somewhat lower than that produced on drive sprocket 19 by slip clutch 31.

Rotation of gear 20 causes gear 17 to turn counterclockwise, and likewise takeup spool 16 through the frictional coupling action of slip clutch 35. The diameters of gears 20 and 17, and of the takeup spool 16 are so proportioned that the takeup spool 16 will at all times slip on shaft 18, thereby holding tension on the cover films 37 and 38 in accordance with the torque characteristics of slip clutch 35. The diameter relationship of sector gear 26, gear 21, and drive sprocket 19 is such that for a full upward stroke of actuating mechanism 2 bonding tape 14 is advanced exactly one-half center-to-center distance between stickers 39.

The user again presses on knob 48. Sector gear 26 rotates clockwise and for reasons explained above, no rotation of drive sprocket 19 or of takeup spool 16 and supply spool 15 occurs. Thus the bonding tape 14 is not transported. However the downward stroke of cylinder 3 causes the top sheet of paper to be pressed against sticker 39, and this in turn against the bottom sheet lying on anvil 12. As the user's hand is taken from knob 48 the upward motion of actuating mechanism 2 brings about a repeat of the transport of bonding tape 14 described above; now however a portion of bonding tape 14 containing no sticker 39 is brought through the head 46. Thus as the bonded-together sheets of paper are lifted by suction, no sticker 39 is dispensed into the insertion gap 11. The suction is broken quickly by air leakage into chamber 43 through the clearance between plunger 4 and cylinder 3, and the bonded sheets may be withdrawn from the apparatus by the user. The sheets can also be withdrawn earlier, even while there is still a vacuum in chamber 43, by firmly pulling on the sheets in a direction substantially parallel to face plate 5 and anvil 12. The apparatus is now again at rest, ready for a repeat of the above-described bonding cycle.

It will be readily observed that if the user had inserted three or more sheets of paper, the first two actuations of knob 48 would have bonded the top sheet to the second sheet, the next two actuations would have bonded this assemblage to the third sheet, and so on.

I claim:
1. A bonding machine comprising:
   a housing;
   a first surface on said housing;
   an actuating mechanism mounted for motion in said housing and having a second surface, said first and second surfaces normally biased apart to form an insertion gap, but arranged to be brought into parallel contacting relationship by force applied to said actuating mechanism to close said insertion gap and to press together any sheets of material inserted therein, said actuating mechanism also having sheet separating means to selectively attract that sheet in said insertion gap which is closest to said sheet separating means;
   bonding tape means operatively associated with said actuating mechanism and comprising a bonding tape containing a plurality of spaced stickers coated on front and back surfaces with adhesive, further comprising a tape storage and transport mechanism arranged to store said bonding tape, to advance it in synchronism with the motion of said actuating mechanism, to position a sticker in said insertion gap when said sheet separating means has separated a sheet from another or others in said insertion gap, and to take up spent portions of said bonding tape.

2. A bonding machine of the character set forth in claim 1, in which:
   said actuating mechanism comprises a cylinder spring-biased upwardly in said housing, said cylinder having a rack on its outer surface facing said tape storage and transport mechanism, a plunger inside said cylinder spring-biased upwardly, a knob at the upper extremity of said plunger, perforated face plate closing off the lower extremity of said cylinder, seal means surrounding said face plate, and stop means to limit the upward motion of said cylinder inside said housing, and of said plunger inside said cylinder;
   said tape storage and transport mechanism comprises a bonding tape consisting of a plurality of stickers coated on front and back surfaces with an adhesive of the self-adhesive type which requires only contact or the application of pressure to cause adhesion, said stickers disposed between two cover films and spaced evenly lengthwise so as to make the center-to-center distance between adjacent stickers twice the distance said bonding tape is transported by a full upward stroke of said cylinder, said stickers having a length approximately one-half the center-to-center distance, said tape storage and transport mechanism further comprising side plates, a first shaft journalled in said side plates, a sector gear fixed on said first shaft, said sector gear engaging said rack, second shaft journalled in said side plates, first gear rotatably mounted on said second shaft and meshing with said sector gear, second gear and a drive sprocket fixed on said second shaft, a friction clutch operatively associated with said first and second gears, and a unidirectional clutch operatively associated with said second shaft so as to limit bonding tape motion to one feeding stickers toward said insertion gap, a third shaft journalled in said side plates, and a third gear fixed to said third shaft, said third gear meshing with said second gear, a friction clutch operatively associated with said third gear and with a takeup spool rotatably mounted on said third shaft, a fourth shaft fixed to said side plates, a supply spool rotatably and frictionally mounted on said fourth shaft, a head comprising two wedge-shaped members, each having an acute angle on the side facing said insertion gap, said bonding tape initially stored on said supply spool, said cover films, following separation from said stickers in said head, passing over said drive sprocket, thence over an idler pulley on a fifth shaft fixed to said side plates to said takeup spool.

3. A bonding machine of the character set forth in claim 1, in which:

said actuating mechanism comprises a cylinder spring-biased upwardly in said housing, said cylinder having a rack on its outer surface facing said tape storage and transport mechanism, a plunger inside said cylinder spring-biased upwardly, a knob at the upper extremity of said plunger, perforated face plate closing off the lower extremity of said cylinder, seal means surrounding said face plate, and stop means to limit the upward motion of said cylinder inside said housing, and of said plunger inside said cylinder;

said tape storage and transport mechanism comprises a wedge-shaped head, having an acute angle on the side facing said insertion gap, a bonding tape consisting of a plurality of stickers coated on front and back surfaces with an adhesive of the self-adhesive type which requires only contact or the application of pressure to cause adhesion, said stickers disposed on a support film and spaced evenly lengthwise so as to make the center-to-center distance between adjacent stickers twice the distance said bonding tape is transported by a full upward stroke of said cylinder, said stickers having a length approximately one-half the center-to-center distance, said stickers adhering more strongly to a side 1 of said support film than to a side 2, so that as said bonding tape is pulled off said supply spool by said tape transport mechanism said stickers adhere preferentially to said side 1 on its way to said head, said side 1 being the side flexing convexly in going around said acute angled edge of said head, said tape storage and transport mechanism further comprising side plates, a first shaft journalled in said side plates, a sector gear fixed on said first shaft, said sector gear engaging said rack, second shaft journalled in said side plates, first gear rotatably mounted on said second shaft and meshing with said sector gear, second gear and a drive sprocket fixed on said second shaft, a friction clutch operatively associated with said first and second gears, and a unidirectional clutch operatively associated with said second shaft so as to limit bonding tape motion to one feeding stickers toward said insertion gap, a third shaft journalled in said side plates, and a third gear fixed to said third shaft, said third gear meshing with said second gear, a friction clutch operatively associated with said third gear and with a takeup spool rotatably mounted on said third shaft, a fourth shaft fixed to said side plates, a supply spool rotatably and frictionally mounted on said fourth shaft, bonding tape initially stored on said supply spool, said support film, following separation from said stickers in said head, passing directly over said drive sprocket, thence over an idler pulley on a fifth shaft fixed to said side plates to said takeup spool.

4. A bonding machine of the character set forth in claim 1, in which:

said actuating mechanism comprises a cylinder spring-biased upwardly in said housing, said cylinder having a rack on its outer surface facing said tape storage and transport mechanism, a plunger inside said cylinder spring-biased upwardly, a knob at the upper extremity of said plunger, perforated face plate closing off the lower extremity of said cylinder, seal means surrounding said face plate, and stop means to limit the upward motion of said cylinder inside said housing, and of said plunger inside said cylinder;

said tape storage and transport mechanism comprises a bonding tape consisting of a plurality of stickers coated on front and back surfaces with a premoisturized adhesive, said stickers disposed and sealed by seal beads between two cover films to form a vapor-tight compartment about each sticker, said stickers spaced evenly lengthwise so as to make the center-to-center distance between adjacent stickers twice the distance said bonding tape is transported by a full upward stroke of said cylinder, said stickers having a length approximately one-half the center-to-center distance, said tape storage and transport mechanism further comprising side plates, a first shaft journalled in said side plates, a sector gear fixed on said first shaft, said sector gear engaging said rack, second shaft journalled in said side plates, first gear rotatably mounted on said second shaft and meshing with said sector gear, second gear and a drive sprocket fixed on said second shaft, a friction clutch operatively associated with said first and second gears, and a unidirectional clutch operatively associated with said second shaft so as to limit bonding tape motion to one feeding stickers toward said insertion gap, a third shaft journalled in said side plates, and a third gear fixed on said third shaft, said third gear meshing with said second gear, a friction clutch operatively associated with said third gear and with a takeup spool rotatably mounted on said third shaft, a fourth shaft fixed to said side plates, a supply spool rotatably and frictionally mounted on said fourth shaft, a head comprising two wedge-shaped members, each having an acute angle on the side facing said insertion gap, said bonding tape initially stored on said supply spool, said cover films, following separation from said stickers in said head, passing over said drive sprocket, thence over an idler pulley on a fifth shaft fixed to said side plates to said takeup spool.

5. A bonding machine comprising:

a housing;

a first surface on said housing;

an actuating mechanism mounted for motion in said housing and having a second surface, said first and second surfaces normally biased apart to form an insertion gap, but arranged to be brought into parallel contacting relationship by force applied to said actuating mechanism to close said insertion gap and to press together any sheets of material inserted therein, said actuating mechanism also having sheet separating means to selectively attract that sheet in said insertion gap which is closest to said sheet separating means;

a bonding tape and a tape storage and transport mechanism located in said housing and forming a cartridge capable of insertion into, and withdrawal from said housing as a unit, said bonding tape comprising a plurality of spaced stickers having adhesive on front and back surfaces, and said tape storage and transport mechanism arranged to store said bonding tape, to advance it in synchronism with the motion of said actuating mechanism, to remove a sticker from the bonding tape and to position it between said attracted sheet and the adjacent unattracted sheet after the sheet separating means has caused separation to occur.

6. A bonding machine of the character set forth in claim 5, in which force is applied manually to said actuating mechanism.

7. A bonding machine of the character set forth in claim 5, in which sheet separation is effected by vacuum action.

8. A bonding machine of the character set forth in claim 5, in which said bonding tape comprises a non-adhesive film and said stickers sequentially spaced thereon, and in which the adhesive on front and back surfaces is of the self-adhesive type requiring only contact with, or pressure against a sheet of material to cause adhesion.

9. A bonding machine of the character set forth in claim 8 in which said tape storage comprises a supply spool and a takeup spool, and in which the stickers are removed from said film by peeling as the bonding tape in its passage from the supply spool to the takeup spool is caused to execute a sharp turn around a transversely positioned acute-angled head located adjacent to said insertion gap.

10. A bonding machine of the character set forth in claim 9, in which at the end of a transport motion of said transport mechanism, and concurrently with the completion of sheet separation, the sticker is held to the film by its trailing edge, thereby causing it to be positioned between the attracted sheet and adjacent unattracted sheet in a suspended mode.

11. A bonding machine of the character set forth in claim 9, in which said transport mechanism comprises a shaft operatively associated with said actuating mechanism, a toothed sprocket fixed on said shaft, and a slip clutch having a driving surface operatively associated with said shaft and a driven surface operatively associated with said takeup spool and having said driving and driven surfaces in frictional slipping engagement.

* * * * *